July 11, 1944.  L. M. SIMPSON ET AL  2,353,417
DISTRIBUTOR MECHANISM FOR CONTROLLING THE
RELEASE OF BOMBS OR THE LIKE
Filed Sept. 26, 1941   8 Sheets-Sheet 1

FIG. 1

July 11, 1944.    L. M. SIMPSON ET AL    2,353,417
DISTRIBUTOR MECHANISM FOR CONTROLLING THE
RELEASE OF BOMBS OR THE LIKE
Filed Sept. 26, 1941    8 Sheets-Sheet 6

Inventors
L. M. Simpson
C. R. Woodland
by
Young, Emery & Thompson
attys

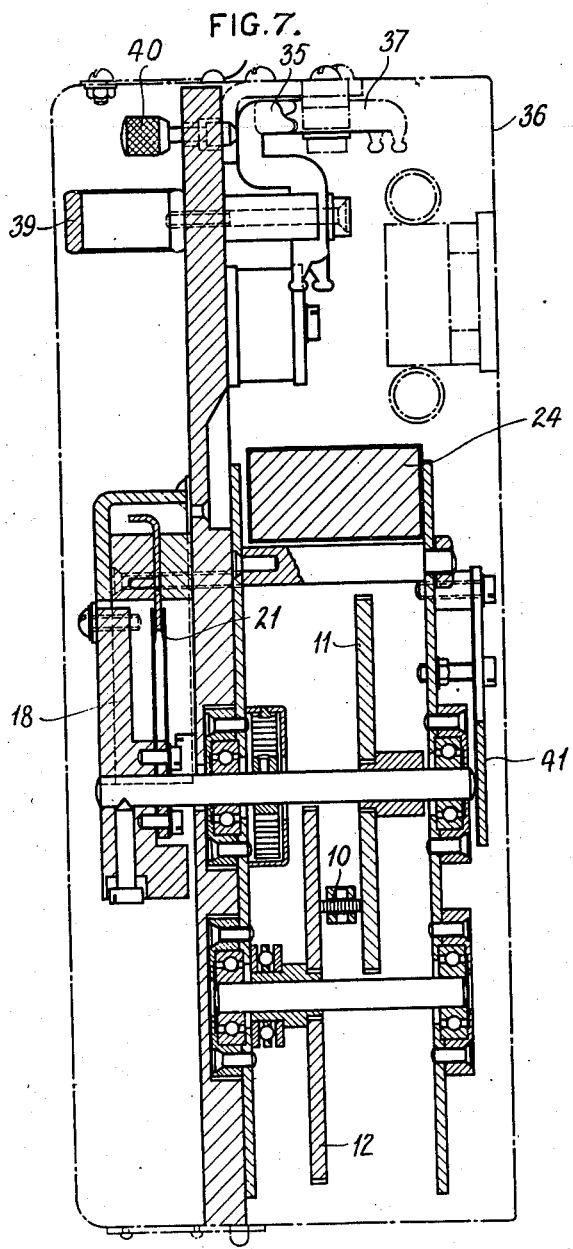

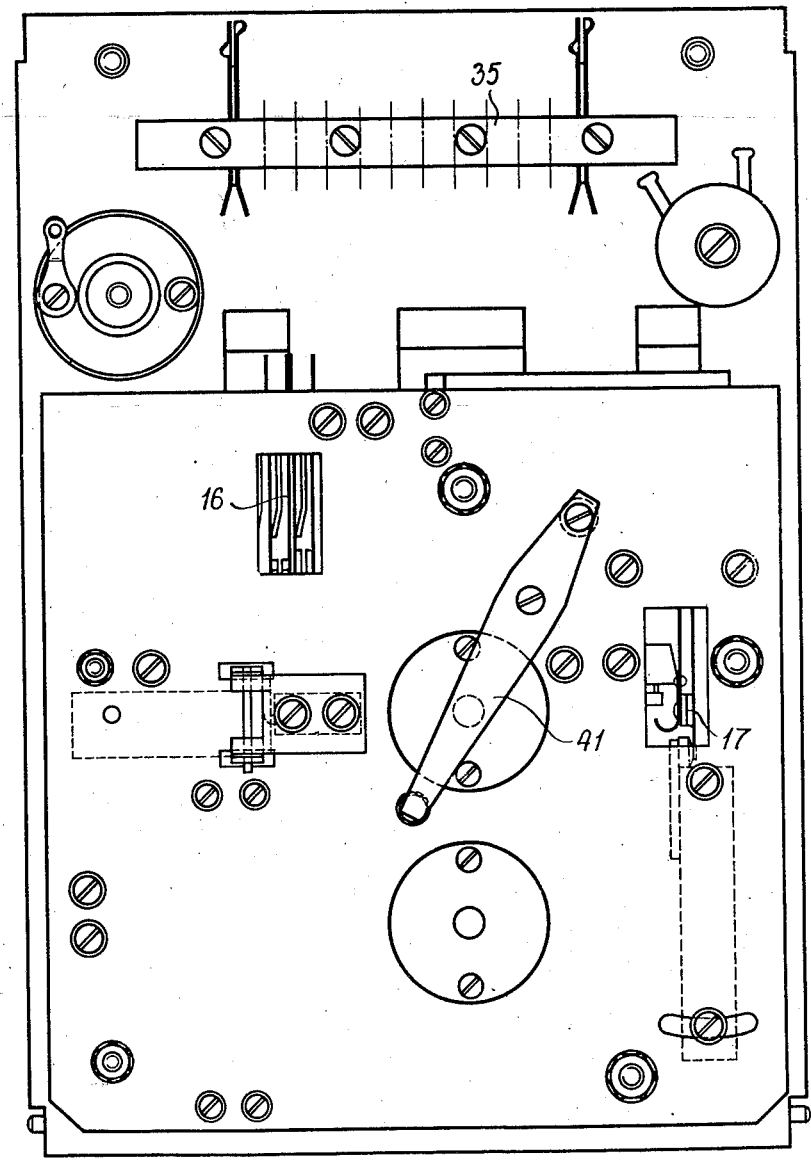

Patented July 11, 1944

2,353,417

UNITED STATES PATENT OFFICE 2,353,417

DISTRIBUTOR MECHANISM FOR CONTROLLING THE RELEASE OF BOMBS OR THE LIKE

Lancelot Martin Simpson, Thorner, near Leeds, and Cecil Robert Woodland, Liverpool, England, assignors to Automatic Telephone & Electric Company Limited, London, England, a British company Application September 26, 1941, Serial No. 412,514
In Great Britain October 13, 1938

14 Claims. (Cl. 89—1.5)

The present invention relates to distributor mechanisms for transmitting electrical signals successively to a plurality of responding devices for controlling the release of bombs or the like from aircraft in a predetermined sequence with a predetermined time relation between successive releasing operations. For instance if it is desired to drop a number of bombs in sequence so that the craters overlap, the automatic distributor device which controls the release of the bombs will be set correspondingly in accordance with the speed of the aircraft and the known spacing depending upon the type of bomb.

One possible arrangement for permitting variation to achieve this result with different speeds of aircraft and different bomb spacings is to allow the distributor mechanism to run at a constant speed and operate a moving brush and to adjust the spacing of the electrical contacts engaged thereby for controlling the releasing operations so that the time between successive operations may be lengthened or shortened depending upon the actual distance between the contacts. The chief object of the invention is to provide an alternative arrangement for achieving the same result which involves no movement of the contacts so that a cheaper and more robust construction can be utilised.

According to the invention, in a distributor mechanism for controlling the release of bombs or the like from aircraft by electrical signals transmitted successively over a plurality of fixed contacts by means of a moving brush, the interval between successive signals is varied by varying the speed of the moving brush by alteration of the gear ratio between the brush driving shaft and a governor shaft which rotates at constant speed.

The invention will be better understood from the following description of one method of carrying it into effect reference being had to the accompanying drawings comprising Figs. 1-8. These drawings show various views of a preferred embodiment of a distributor mechanism suitable for controlling the release of bombs from an aeroplane in a spaced sequence.

Figure 2:
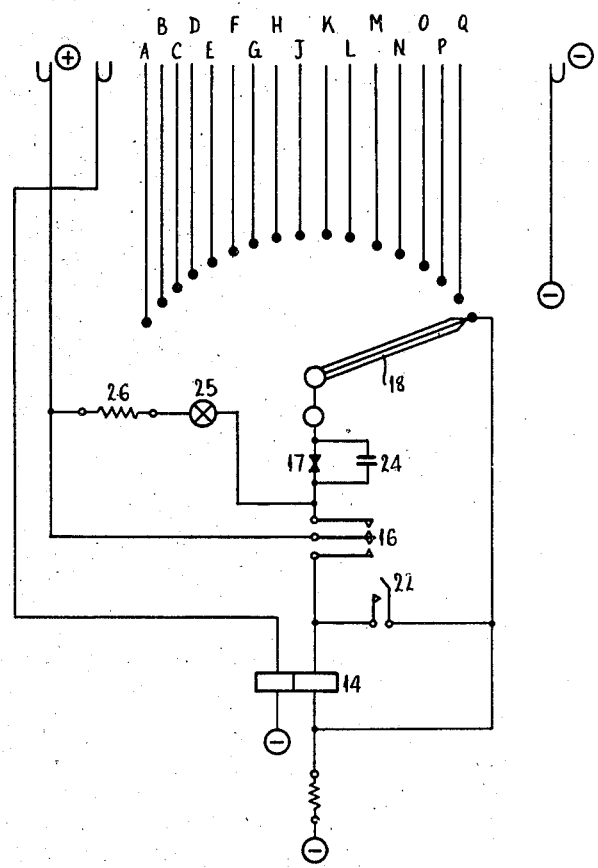
Figure 3:
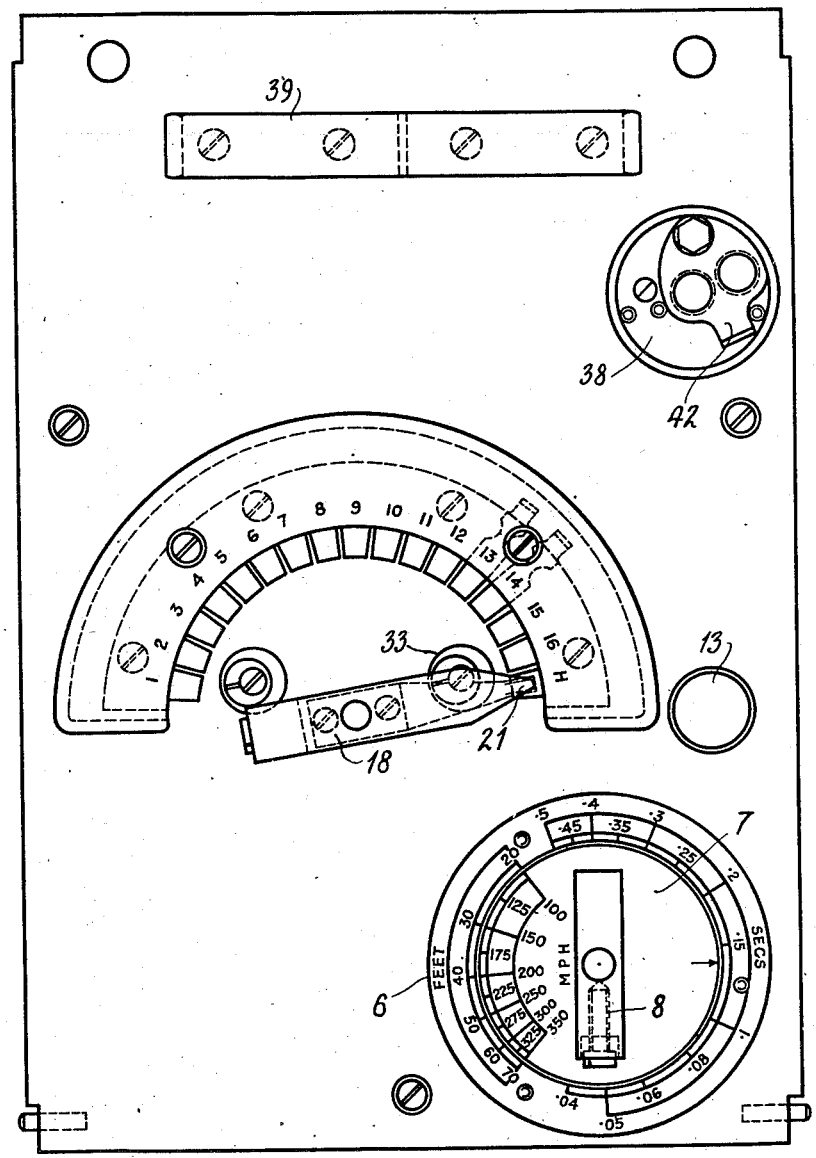
Figure 4:
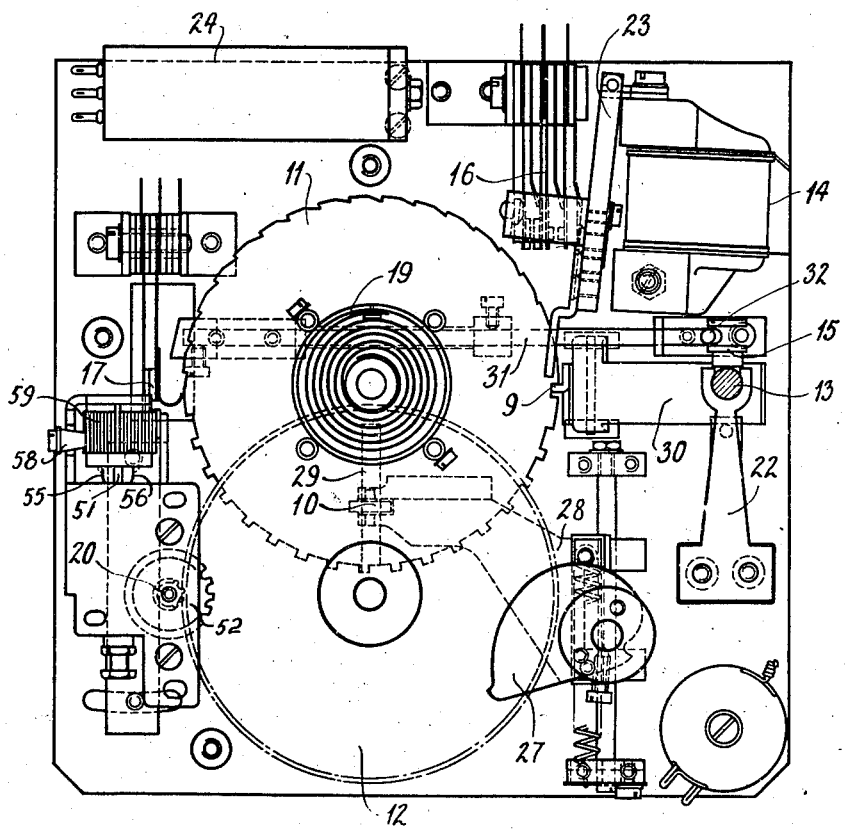
Figure 5:
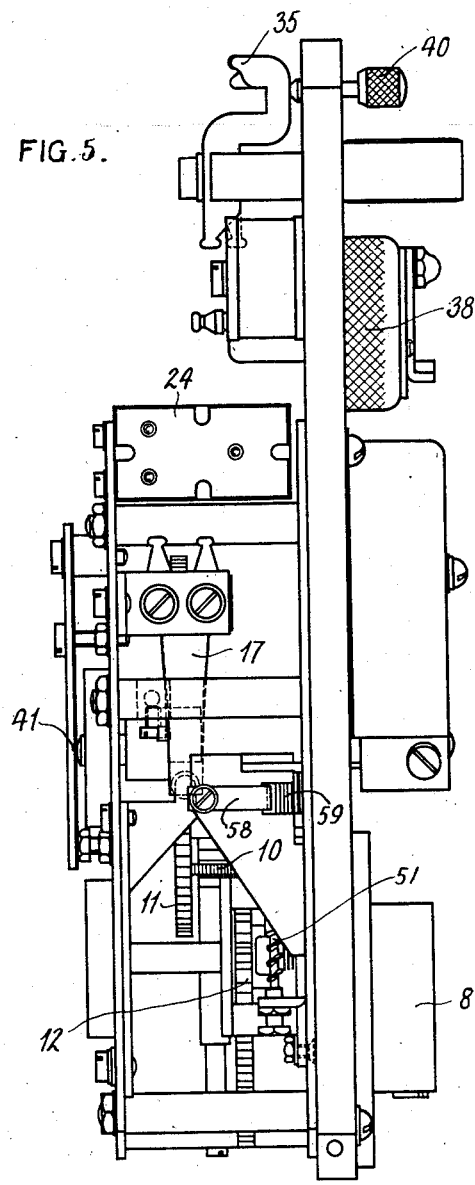
Figure 6:
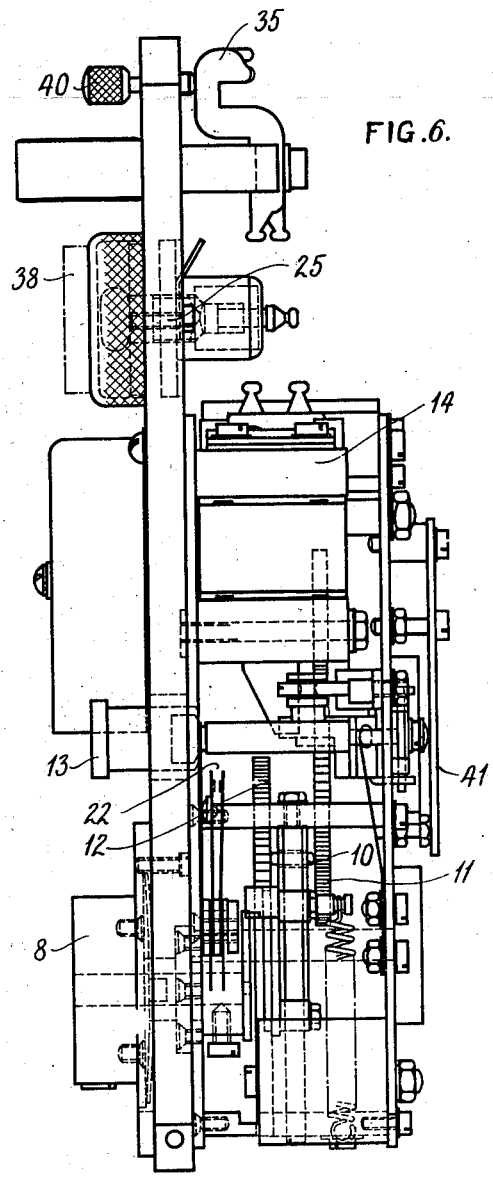

Fig. 1 shows diagrammatically the mechanical principles incorporated in the invention, Fig. 2 is a circuit diagram showing the electrical arrangements, Fig. 3 is a view of the front panel of the apparatus showing the time and distance dials, automatic selecting arm, pilot lamp and control push button, Fig. 4 is a front view of the mechanism with the front panel removed and also the front plate which serves to enclose and protect the mechanism proper, Fig. 5 is a side view of the mechanism looking from the left of the view shown in Fig. 4 and Fig. 6 is a similar side view from the right. Fig. 7 is a sectional view looking in the same direction as Fig. 6 taken on the centre line of the contact bank with the selecting wiper connecting with the ninth contact, and also shows the location of the mechanism case and cover, while Fig. 8 is a view of the mechanism from the rear.

In order that the operation of the distributor mechanism may be properly understood, a brief description will first be given of the action of using the device. The first operation is that the dial 7 is turned by means of the handle 8 so that the marking thereon corresponding to the known speed of the aeroplane registers with the marking corresponding to the desired spacing as set out on the fixed ring 9. Alternatively, if it is more convenient to calculate in terms of the time interval between successive releases, the arrow on the dial 7 is set to the corresponding figure. The operator now presses the push button 13 and rotates the arm 18 in a counter-clockwise direction against the action of a spring 209 to the limit of its travel. The push button is then released and the arm 18 remains in the position to which it has been set. When the aeroplane reaches a suitable position and bomb dropping is to commence, a firing button is momentarily operated which effects the release of the arm 18 which then restores to normal at a pre-determined speed and the brush 21 engages successively with the various contacts at the bank. Circuits are thereby completed in turn over the various contacts and if the selector switches included in these circuits have also been operated the release of a bomb or group of bombs is initiated in each position. When the arm 18 reaches its home position, the equipment is restored to normal and a similar operation may be effected subsequently if there are any bombs still unreleased. The effect of the various operations will now be considered in greater detail.

When the dial 7 is turned the snail cam 27, Fig. 4, engages the pin on the carriage 28 so that the latter is moved up or down under spring control and carries with it the friction coupling wheel 10 which, as may best be seen from Fig. 1, is adapted to transmit a drive from the toothed wheel 11 which is rotated by the arm 18 to the wheel 12 which drives the governor 34. The governor 34 is of the well-known flyball type and has the effect of ensuring that the wheel 12 rotates at substantially constant speed; consequently the wheel 11 will be rotated at a speed which varies with the position of the wheel 10. The governor comprises essentially a worm shaft 51 arranged to be driven by a worm wheel 52 and provided with two flyballs 53 and 54 mounted at the extremities of spring members 55 and 56. These flyballs are adapted when urged outwards by centrifugal force to engage with the sides of a cup 57 whereby a braking effect is produced which increases with the speed of rotation of the balls. The cup 57 is preferably conical and is rotatably supported on a screw mounting so as to be capable of axial movement. In view of the tapering internal surface, when the cup is moved by rotating it, the flyballs engage it at a different radius and hence the speed determined by the governor is altered. A spring detent member 58 engaging with the knurled outer surface 59 of the cup serves to prevent undesired movement.

In order to render the movement of the coupling wheel 10 possible without undue difficulty, the wheel 11 is provided with a radial slot or groove 29 in which the wheel 10 rests when the wheel 11 is in the normal position and along which it moves during the initial positioning movement. During the subsequent operation of the device, however, when the wheel 11 is moved off-normal, the coupling wheel 10 rides out of the slot 29 and provides a reliable drive for the wheel 12.

The push button 13 is now depressed and this in turn moves the pivot member 30 so as to disengage the detent member 109 from the so-called dog or castle teeth on the ratchet wheel 11. A collar 15 on the plunger rod of the push button 13 also engages the turned over end 32 of the rod 31 which is therefore displaced so as to move the interrupter springs 17 clear of the associated teeth on the wheel 11. When the operator, still depressing the push button 13, turns the selecting switch 18 in an anti-clockwise direction until its rear end comes up against the stop 33, the wiper 21 is moved into engagement with contact 1 of its bank. During this operation energy is stored in the coil spring 19 and the rotation of the wheel 11 drives the wheel 12 by way of the friction coupling wheel 10. Since, however, the governor 34 is driven by a one-way connection incorporated in the hub 20, it is not operated at this time and the movement of the arm 18 may therefore be made without any restriction. The push button 13 is now released with the result that contacts 17 again come under the control of the teeth on the upper half of wheel 11 while the detent member 9 engages with a suitable one of the dog teeth so that a return movement of the wheel 11 is prevented. The apparatus is thus left in readiness for use when the aeroplane reaches a suitable position for releasing its bombs.

When this occurs the operator presses a start or firing button the effect of which is to complete a circuit for energising magnet 14. This thereupon attracts its armature 23 the tail of which engages with the detent member 9 and withdraws it from the co-operating tooth on the wheel 11. In this case, however, there is no movement of the contacts 17 which are thus left in position to perform their appointed function. The movement of armature 23 also has the effect of operating contacts 16 which, as may be seen from Fig. 2 completes a locking circuit for magnet 14 over another winding and also apply positive potential to the wiper 21 so that the bomb releasing circuits may be completed over the various contacts of the bank. The movement of arm 18 and wiper 21 is effected due to the tension stored in spring 19 and the speed of travel of the wiper and hence the time interval between successive bomb releases is dependent upon the position to which the coupling wheel 10 has been set, since as previously pointed out the speed of wheel 12 is substantially constant owing to the effect of governor 34.

The contacts 17 which are of robust construction are connected in series with the wiper 21 and are intended to prevent the heavy current which flows over the wiper from being broken at the wiper tip which would result in rapid destruction of both the wiper tip and the bank contacts. The adjustment of the lever which operates springs 17 in conjunction with the shape of the teeth is such that during the movement of the wiper from one contact to another the circuit is broken at interrupter contacts 17. It is then made when the wiper is squarely on the contact and is again broken as the wiper is about to leave the contact. The shape of the teeth, moreover, is such that a quick break is produced at contacts 17 substantially independently of the speed of rotation of the wheel. Sparking at contacts 17 is reduced by connecting the condenser 24 across them.

After the start magnet 14 has been energised to initiate the return movement of the arm 18, this movement will normally proceed unchecked until the arm reaches its normal position. In case, however, it may be desirable for any reason to stop the action of the device before it has been completed, this may be done by momentary reoperation of the push button 13. This has the effect of closing contacts 22, which as shown in Fig. 2 thereupon short-circuit the locking winding of magnet 14 and thus bring about its release. Thereupon when the button is released detent 9 is again moved into the path of the dog teeth and consequently the movement of wheel 11 is arrested and no further bomb dropping operation takes place. The remaining bombs may be released by a further momentary operation of the firing button which produces reenergisation of magnet 14 with the same results as previously described.

If, however, the bomb releasing operation continues unchecked until wiper 21 reaches its home position, a circuit will then be automatically completed for short-circuiting magnet 14 which is thus released. It should be mentioned that it is not necessary for the arm 18 to be moved over the whole of the bank but that if necessary it can be set on any particular contact and retained there after the release of the push button 13. Restoration to normal with consequent bomb dropping operations will then be effected in response to the momentary operation of the firing button.

As previously mentioned, the fact that positive potential has been connected over wiper 21 to one of the leads A—Q does not necessarily mean that the bombs controlled by these circuits have been released since the circuit will preferably include additional selecting switches. In these circumstances it is desirable to provide some supervisory arrangement to indicate which bombs have been released and which are still retained. It will be understood that in accordance with standard practice each bomb release unit on operating to effect release of the associated bomb will open a point in the release control circuit. Hence while the bomb is ready to be released negative potential will be fed back over one of the control leads A to Q, assuming the appropriate selecting switch is closed, but this potential is removed after the bomb has been released. The lamp 25 enables the operator to ascertain readily by manual operation of the selecting arm 18 how many bombs are in condition to be dropped. When the arm 18 encounters a contact corresponding to a bomb in place and with the associated selecting switch closed a circuit is completed for the lamp 25 from positive, resistance 26, lamp 25, contacts 17, selecting arm 18 and thence over the contact to negative in the bomb release circuit. It will be understood that the resistance of this circuit is too high to cause the bomb release mechanism to function but is sufficient to produce a glow on the indicating lamp to show that the corresponding bomb is in readiness to be released. The purpose of using a low voltage lamp in series with a resistance is to provide a factor of safety in case for any reason the lamp should become short-circuited in which case the bomb release mechanism would receive full current and the bomb might therefore be released inadvertently. The lamp 25 is mounted under the lamp cover assembly 38 which is provided with a movable shutter 42 having two windows, one clear and one coloured. During daylight conditions the shutter is in the position to render the clear window effective so as to give a maximum light, while under night conditions the shutter is used in the position in which the coloured window is effective so as to avoid any possibility of dazzling the operator.

In order that the unit described may be quickly replaced by another unit in case of a fault, all electrical connections thereto are extended by way of a spring connecting jack 35 which when the unit is inserted in the case member 36 engages with a multiple contact plug member 37 to which is wired the connecting cable extending to the firing button, operating battery, and bomb release devices. The front panel also carries a handle 39 which serves to assist in the manipulation of the unit. The screw 40 engages with a suitable co-operating member when the unit is in position and serves to prevent it being inadvertently moved. In order to maintain adequate pressure between the wheel 12, the coupling wheel 10 and the toothed wheel 11, the shaft on which the latter is carried is engaged at one end by the flat spring 41 shown in Figs. 7 and 8. It will be seen from Fig. 7 that the main rotating parts of the mechanism are provided with ball bearings thereby securing smoothness and reliability of operation.

What we claim as new and desire to secure by Letters Patent is:

1. A mechanism for controlling the electrical release of bombs or the like from aircraft comprising a frame, a first shaft journalled in said frame, a spring fixed at one end to said frame and at the other to said shaft, a manually operable member secured to said shaft whereby said spring may be tensioned by operation of said member, a toothed wheel attached to said shaft, a movable dog normally in engagement with the teeth of said wheel, a manually operable push button arranged when operated to move said dog out of engagement with said toothed wheel, a second shaft also journalled in said frame, variable speed gearing connecting the two shafts and governor means for maintaining the speed of said second shaft substantially constant when it is rotated by the tension of said spring by way of said variable speed gearing.

2. A mechanism for controlling the electrical release of bombs and the like from aircraft comprising in combination a first shaft, a source of power for rotating said first shaft, a brush secured to said first shaft, means to control the release of bombs including the aforesaid brush and a set of contacts cooperating with said brush, a second shaft, variable speed gearing connecting said first shaft and said second shaft and governor means for maintaining the speed of said second shaft substantially constant when it is rotated by said source of power by way of said variable speed gearing thereby permitting variation of the time interval between the engagement of successive contacts of the set by said brush.

3. A mechanism for controlling the electrical release of bombs or the like from aircraft comprising in combination a first shaft, a source of power for rotating said first shaft, a brush secured to said first shaft, means to control the release of bombs including the aforesaid brush and a set of contacts cooperating with said brush, a second shaft, a first wheel secured to said first shaft, a second wheel secured to said second shaft, a rotatably-mounted friction wheel capable of axial movement between said first and second wheels so as to constitute a variable speed coupling between said first and second shafts and governor means for maintaining the speed of said second shaft substantially constant when it is rotated by said source of power by way of said friction wheel, thereby permitting variation of the time interval between the engagement of successive contacts of the set by said brush.

4. A control mechanism as claimed in claim 3 in which the movement of said friction wheel is effected by the setting of a manually operated dial graduated to indicate the time interval between the engagement of successive contacts of the set by said brush.

5. A control mechanism as claimed in claim 3 in which said first wheel is provided with a radial groove in which said friction wheel is located when said first wheel is in its starting position to enable the setting of said friction wheel to be effected without difficulty.

6. A mechanism for controlling the electrical release of bombs and the like from aircraft comprising in combination a first shaft, a source of power for rotating said first shaft, a brush secured to said first shaft, means to control the release of bombs including the aforesaid brush and a set of contacts cooperating with said brush, a second shaft, variable speed gearing connecting said first shaft and said second shaft, governor means for maintaining the speed of said second shaft substantially constant when it is rotated by said source of power by way of said variable speed gearing, a wheel also secured to said first shaft, a set of teeth on said wheel, a pair of interrupter contacts included in circuit with said brush, and means controlled by said teeth for opening the said interrupter contacts during the movement of said brush from one contact to the next.

7. A control mechanism as claimed in claim 6, including a second set of teeth on said wheel, a dog normally in engagement with said second set of teeth and a manually operable push button arranged when operated to move said dog out of engagement with said teeth and to disable said means for operating said interrupter contacts whereby on the operation of said push button said brush may be moved in either direction without operating said interrupter contacts.

8. A control mechanism as claimed in claim 6 in which the first set of teeth on said wheel are so shaped as to give a quick break of said interrupter contacts independent of the speed of rotation of the wheel.

9. A mechanism for controlling the electrical release of bombs and the like from aircraft comprising a frame, a first shaft journalled in said frame, a spring fixed at one end to said frame and at the other to said shaft, a manually operable member secured to said shaft whereby said spring may be tensioned by operation of said member, a brush also secured to said shaft, means to control the release of bombs including the aforesaid brush and a set of contacts cooperating with said brush, a toothed wheel also secured to said shaft, a movable dog normally in engagement with the teeth of said wheel, a manually operable push button arranged when operated to move said dog out of engagement with said toothed wheel, a second shaft also journalled in said frame, variable speed gearing connecting said first shaft and said second shaft and governor means for maintaining the speed of said second shaft substantially constant when it is rotated by the tension of said spring by way of said variable speed gearing.

10. A mechanism for controlling the electrical release of bombs and the like from aircraft comprising a frame, a first shaft journalled in said frame, a spring fixed at one end to said frame and at the other to said shaft, a manually operable member secured to said shaft whereby said spring may be tensioned by operation of said member, a brush also secured to said shaft, means to control the release of bombs including the aforesaid brush and a set of contacts cooperating with said brush, a toothed wheel also secured to said shaft, a movable dog normally in engagement with the teeth of said wheel, a manually operable push button arranged when operated to move said dog out of engagement with said toothed wheel, a second shaft also journalled in said frame, variable speed gearing connecting said first shaft and said second shaft, governor means for maintaining the speed of said second shaft substantially constant when it is rotated by the tension of said spring by way of said variable speed gearing, an electromagnet, means for operating said electromagnet, an armature for said electromagnet arranged to remove said dog from said toothed wheel and to complete a locking circuit for said electromagnet, and means whereby the operation of said armature serves to connect potential to said brush.

11. A control mechanism as claimed in claim 10 in which when said brush reaches its initial position a circuit is completed thereover for short-circuiting said electromagnet whereupon it releases and again permits said dog to engage said toothed wheel.

12. A control mechanism as claimed in claim 10 including contacts operated by said push button arranged to short-circuit said magnet whereupon said dog re-engages said toothed wheel and the movement of said brush is terminated.

13. A mechanism for controlling the electrical release of bombs and the like from aircraft comprising in combination a frame, a first shaft journalled in said frame, a spring fixed at one end of said frame and at the other end to said shaft, a manually operable member secured to said shaft whereby said spring may be tensioned by operation of said member, a toothed wheel attached to said shaft, a movable dog normally in engagement with the teeth of said wheel, a manually operable push button arranged when operated to move said dog out of engagement with said toothed wheel, a brush secured to said first shaft, means to control the release of bombs including the aforesaid brush and a set of contacts cooperating with said brush, and a lamp having one terminal connected to said brush and the other to potential of one polarity whereby when said push button is operated to enable said brush to be moved over said contacts manually or under the tension of said spring, said lamp is lighted when said brush engages a contact to which potential of opposite polarity is connected.

14. A control mechanism as claimed in claim 13 in which the circuit of said lamp includes a resistance to prevent full potential of said one polarity being applied to any of said contacts if said lamp should become short-circuited.

LANCELOT MARTIN SIMPSON.
CECIL ROBERT WOODLAND